United States Patent Office 3,156,570
Patented Nov. 10, 1964

3,156,570
HEAT TREATMENT OF ALBUMEN TO REDUCE THE MICROBIOLOGICAL POPULATION THEREIN
John Holme, Green Township, Hamilton County, Ohio, assignor to The Procter & Gamble Company, Cincinnati, Ohio, a corporation of Ohio
No Drawing. Filed Sept. 28, 1961, Ser. No. 141,319
9 Claims. (Cl. 99—161)

This invention relates to a process for preserving esculent proteinaceous substances, and more particularly, it relates to heating albumen to reduce the population of viable microorganisms and obtain a functionally unimpaired product for use in the culinary art, and the products obtained thereby.

The substance with which this invention is concerned is albumen, the material which is present in greater quantity than either the yolk or shell of the avian egg. As used herein, "albumen" refers to what is popularly known as the "egg white," and is distinguished from "albumin," which is used to refer to a class of proteinaceous materials. Albumen is comprised chiefly of protein substances, and the substances generally said to be present are ovalbumin, constituting about 75 percent of the total solids in the albumen, ovomucoid, ovomucin, ovoconalbumin, and ovoglobulin. The functional characteristics of albumen are determined to a very great extent by the proteinaceous materials in the albumen, and especially by the ovalbumin present.

The largest use of eggs is in the culinary art. A large proportion of the eggs is consumed after merely being cooked and suitably seasoned. Another extensive use for eggs is in the preparation of other edible materials. Ingredients such as flour, sugar, fat, and leavening are added to prepare meringues, cakes, custards, and so on.

In many instances, it is desirable to separate the albumen of the egg from the yolk so that advantage may be taken of the peculiar properties of each of these two constituents. An example of the use of the albumen component is in the preparation of angel food cake. In the preparation of angel food cake, the albumen from a large number of eggs is vigorously beaten in the absence of lipid substances to obtain a stable foam, and then the other ingredients are added. Albumen also is very important in the preparation of the so-called "white cake" which relies entirely upon albumen and requires no egg yolk such as is used in, for example, "yellow cake."

Since half of the annual supply of eggs is produced from March to June, it is necessary to preserve the eggs so that they will be freely available throughout the year. Albumen is an excellent environment to support the growth of microorganisms, such as bacilli, mold, and so on. For this reason, one must take prompt, effective measures to protect the egg from microorganisms. Eggs are preserved either by refrigerating them or by separating them into albumen and yolk, and freezing or drying. Other treatments such as coating the egg in the shell with various substances such as oil or water glass are used alone or in conjunction with refrigeration.

Albumen is successfully dried on a large scale commercially at present, either with spray dryers or roll dryers. The dried materials are not quite as easy to use as the liquid albumen, because they must be reconstituted, and more important, for uses such as prepared batters for the production of pancakes or layer cakes, there is nothing to be gained by drying the albumen because it must be placed in an aqueous medium to prepare the batter, and any microorganisms present in the albumen can then take advantage of the nutrient qualities of the albumen. This growth takes place more slowly in refrigerated batters than it does in batters held at room temperature.

As a marketing consideration, it is preferable not to have to refrigerate a can of batter to prevent spoilage while it awaits purchase by the ultimate consumer. For this reason it is desirable to obtain sterile albumen in liquid form for incorporation into prepared batters.

High temperatures, especially those at least equal to the boiling point of water, are a well-known method of sterilizing materials. Albumen is quite sensitive to heat and at sterilizing temperatures the protein constituents denature and coagulate irreversibly. This so changes the structure of the protein in the albumen that it is no longer of value in the preparation of cakes and other such articles. Other means of sterilization, such as treatment with various chemicals, are known, but these have as degrading an effect on the functional properties of the albumen as does heating. Indeed, it has been remarked that it is much easier to find chemicals which will cause denaturation of proteins than it is to find those which will not.

The literature indicates that certain fatty acids below 12 carbon atoms in chain length tend to inhibit the denaturation of blood serum albumin, the properties of which are considerably different from those of ovalbumin. There are also teachings in the literature to the effect that not only do soap and detergent anions not protect proteinaceous materials, but that they themselves are denaturing agents. In the course of work which led to the surprising discovery of the present invention, it was found from the optical rotation, rate of aggregation as determined by ultracentrifugation, and the viscosity increases, that the addition of soap to albumen accelerated the rate of denaturation compared to albumen which was heat-treated in aqueous solution.

It is an object of this invention to produce an aqueous sterile albumen.

Another object of this invention is to treat albumen with heat sufficient to arrest the growth of microorganisms and to recover functionally unharmed albumen for use in the culinary art.

A further object of this invention is to prepare a sterile batter containing albumen in a functionally unimpaired form.

Other and further objects of this invention will be readily apparent to those skilled in the art after they have read and understood the teachings of this invention.

It has surprisingly been found that while the heat treatment of albumen in an environment of soap results in a product wtihout the culinary functions of the albumen, the precipitation of the added soluble soap by the addition of alkaline earth metals or other heavy metals produces an albumen which is functionally as active in cake-baking and other culinary efforts as is untreated, pristine albumen. In outline, the process of this invention for the preparation of sterile albumen with essentially unimpaired culinary function comprises the steps of adding a certain quantity of a soluble soap containing 12 or more carbon atoms in the fatty acid chain to an aqueous dispersion of albumen containing no more than six percent solids, subjecting this mixture of soap and albumen to temperatures of at least 212° F. to kill or inactivate any microorganisms present or to reduce the total microbiological population to the desired degree; cooling the mixture; and removing the soap anions from solution.

The word "sterility" is used in the art to mean freedom from viable microorganisms. A sterile albumen can be kept at room temperature for any desired length of time without deteriorating as a result of attack by microorganisms. On the other hand, the microbiological population of albumen can also be reduced to any desired level so that said albumen can be kept at a specified temperature for a given period of time. The process of this invention can be used merely to reduce the microbiological population in albumen to a degree where the albumen could be held, say six months at refrigerator temperatures, or it can be used to produce sterile albumen with indefinitely long keeping qualities.

The functionally unimpaired albumen obtained by the process of this invention is excellent for use in the preparation of a refrigerated batter which is ready for immediate use when it is taken from its package. The preparation of such a batter is accomplished by admixing the functionally unimpaired, treated albumen produced by the process of this invention with flour, sugar, and other desired ingredients under aseptic conditions and packing under said aseptic conditions into a container which will protect the prepared batter from invasion by viable microorganisms.

While there are many sources of edible albumen, the most common and generally the most easily obtained and economical is the chicken egg. While the liquid albumen from an average egg contains more than 87% water, it is preferred to dilute the aqueous albumen to a lower solids content. The full-strength liquid albumen requires the addition of a large quantity of soap to protect it during the heat treatment. This large quantity of soap imparts a soapy taste to the albumen which renders it generally unfit for ordinary culinary purposes. After precipitation, however, it is possible to remove the soap from the albumen dispersion by filtration, centrifugation, or other means, but this adds another step (which can be quite difficult) to the process. Because of the foregoing considerations, it is preferable to use an aqueous albumen which contains no more than about six percent solids by weight. The albumen may be more greatly diluted in the instant process, but one then has to contend with large quantities of water which will subsequently have to be removed prior to the albumen's use in cooking. For this reason it is preferable that the aqueous albumen contain at least three percent but not substantially more than six percent of solids by weight, and a five percent concentration has been found to produce very good results.

In the practice of this invention the quantity of soap added is of vital importance. In general, it is desirable to have present from about 0.002 to about 0.010 gram-molecule of soap in each 1000 ml. of albumen dispersion to produce a 0.02 to 0.010 molar solution of soap in the aqueous dispersion. The preferred range of concentration of soap in the albumen is from about 0.003 to about 0.007 molar. If too little soap is added, the albumen will be inadequately protected during the heat-sterilization, and if too much is added, the aforementioned soapy taste ensues. Liquid or solid albumen can be added to a soap solution, or soap can be added to the aqueous albumen dispersion.

In general in the practice of this invention, soaps of fatty acids containing 12 or more carbon atoms in the fatty acid molecule may be used. Little or no difference in the protection of the albumen has been noted between the various chain lengths, such as those containing 14, 16, and 18 carbon atoms. It is preferred to use fatty acid soaps containing from 14 to 22 carbon atoms in the chain. The fatty acid moieties of the soaps may be either saturated or unsaturated, but saturated acids are preferred because there is less opportunity for oxidation under the heat treating conditions when saturated fatty materials are utilized.

The heat treatment contemplated in this invention is accomplished by subjecting the albumen-soap mixture to a temperature of at least 212° F. Temperatures lower than this result in impractically long times required for treatment of the albumen. If sterility is desired, even temperatures of 212° F. require excessively long treatment times. For sterilization of albumen, temperatures of 250° F. and above are desirable. As is well known to those skilled in the art, the temperature and time required for sterilization bear an inverse relation, that is, the higher the temperature used, the shorter the time required for sterilization. Thus, sterility is attained in 20 minutes at 250° F. and in 15 seconds at 300° F. The upper limit of the temperature range which may satisfactorily be employed is determined by the development of off-flavors in the albumen. It has been found that temperatures below about 320° F. are satisfactory for the practice of this invention, and that temperatures of 300° F. and below are preferable.

If it is desired merely to prepare the albumen for use with a refrigerated liquid product, e.g., batter, less strenuous time-temperature conditions can be used. For example, heating the albumen at 212° F. for 30 minutes will double the life of albumen kept at refrigeration temperatures as compared with untreated albumen. In general, the range of temperatures contemplated by the instant invention is from about 212° F. to about 320° F. Where sterility is desired, temperatures of from about 250° F. to about 320° F. are used, with the preferred range being from about 270° F. to about 300° F.

The process may be carried out in any convenient equipment. Heat treatment may be effected on discrete batches of the material by using an autoclave, or the process may be carried out in a series of heat exchangers or a single heat exchanger with a plurality of zones. If the continuous heat exchanger process is used, the albumen-soap mixture can be brought rapidly to the desired temperature, held at that temperature for the required length of time, and then reduced to room temperature, or some other desired lower temperature. If a continuous process is employed, the entire sterilization step may be carried out in a time period of a minute or two.

If a continuous process, such as was just described, is used, it is important that the albumen solids be less than about 6% by weight. In a process with high flow velocities, some coagulation of the albumen appears to take place at the higher solids levels. This may be due to a surface denaturation of the protein under the turbulent flow conditions which prevail in the conduits.

The albumen-soap mixture should be cooled to a temperature below about 140° F. before the protective soap is precipitated. Failure properly to cool the material prior to removing the protective soap will permit the very damage which this invention enables one to prevent. Preferably, the material is cooled to room temperature before the soap is removed.

From the time that the albumen-soap mixture has been treated to reduce the microbiological population, it is necessary to perform all further cooling, mixing precipitating, and blending operations under aseptic conditions. Failure to maintain rigorous asepsis may nullify the advantage of this process by permitting contamination of the albumen with microorganisms.

The removal of soap from solution in the treated aqueous albumen dispersion is the key element in this invention's success in recapturing the functional properties of the albumen. It has been demonstrated that failure properly to remove the soap from solution will produce results no better than those obtained had the albumen not been protected in any manner. Removal of the soluble soap is conveniently effected by precipitating the fatty acid anion chemically or by physically separating the soap and albumen, as by dialysis, electrodialysis, or column chromotography. Whatever method is used, care must be used that the functional properties of the albumen are maintained during the separation. It is preferred to effect soluble soap removal by adding a cation which forms insoluble soaps. Generally, for the purposes of this invention, a soap is considered insoluble if it dissolves in water to form a solution less than $10^{-9}$ molar. Cations which are useful include the alkaline earth metals and heavy metals, that is, those occurring in Groups II and III of the periodic table. The metals include calcium, barium, magnesium, aluminum, and strontium. Suitable anions for use in conjunction with the cations are sulfate, chloride, phosphate, hydroxide, and silicate. Organic anions may be used, especially where it is desirable to obtain the anion's function in the finished product. For instance, calcium ascorbate can be used for the neutralization if it is desired to incorporate an ascorbic acid salt into the finished product. Such an anion would also have properties which would tend to preserve the albumen from deterioration or to protect it from some constituent in the batter into which it is to be incorporated.

The following examples are presented to illustrate the practice of and superior results flowing from the process of this invention, and are not to be construed as limitative.

*Example I*

A soap solution was prepared by adding sufficient potassium myristate to 120 ml. of water to produce a soap concentration of 0.005 molar. Six grams of commercially-dried albumen was then dispersed in the water, and the pH was adjusted to 7 with potassium hydroxide. This soap-protected albumen was then heated to 212° F. and kept at that temperature for 30 minutes, after which it was cooled to room temperature. An amount of calcium chloride equimolar to the potassium myristate was then added to the soap-protected albumen to remove the fatty acid soap from solution.

A cake batter was prepared according to the following recipe:

| | | |
|---|---|---|
| Flour | g | 95 |
| Shortening | g | 50 |
| Sugar | g | 133 |
| Salt | g | 1.5 |
| Dried skimmed milk solids | g | 12 |
| Distilled water | ml | 40 |
| Protected albumen solution | ml | 25 |

The foregoing ingredients were mixed for 5 minutes at medium speed on an electric kitchen mixer. The mixer was then set to a very slow speed, 5.8 g. of double-acting baking powder was added, and mixing proceeded for one minute. The remaining 95 ml. of protected albumen solution was then added with 2.5 cc. of vanilla flavor and mixed at medium speed for 2 minutes.

Four hundred grams of this batter was placed in an 8-inch cake pan and baked for 25 minutes at 365° F. The volume was then measured.

To furnish controls, two additional cakes were baked in the same manner as that made with the protected albumen. For the first control, a cake was baked with albumen which was not heat-treated, and for the second control, a cake was baked with albumen heated for 30 minutes at 212° F. without any potassium myristate to protect it.

The volumes obtained with cakes using 400 g. of each of these three batters were:

| Batter— | Volume cc. |
|---|---|
| Unheated albumen | 1115 |
| Unprotected heated albumen | 1005 |
| Heated albumen protected with potassium myristate | 1130 |

In addition to good volume, the cake baked with the heated albumen which had been protected with potassium myristate had a good texture and appearance.

The foregoing example is illustrative of the procedure used to produce a functionally unimpaired albumen with a reduced microbiological population. The following example discloses a procedure which will produce a functionally unimpaired, sterile albumen.

*Example II*

Dried egg albumen was added to distilled water to produce a 5%, by weight, dispersion of albumen solids in the water. Sodium stearate was added to the albumen dispersion in an amount sufficient to produce a concentration of 0.005 molar. The protected albumen was sterilized by pumping it through a three-part jacketed heat exchanger. The first section of the exchanger heated the soap-albumen dispersion to 275° F. in a few seconds, the second section maintained the dispersion at the aforesaid temperature for about 30 seconds, and the third section cooled it to room temperature in a few seconds. The stearate was precipitated by adding calcium chloride in an amount equimolar to the sodium stearate.

To 100 ml. of the albumen was added 200 ml. of 1½-strength fluid thioglycolate medium obtained from the Baltimore Biological Laboratories. The mixture was incubated for 14 days at 32° C. and examined microscopically. A portion of this incubated mixture was also streaked onto plates of tryptone glucose extract agar and incubated for four additional days at 32° C. No bacterial cells were found in the direct microscopic examination, nor was there any growth on the agar medium. Failure to detect bacterial cells in the incubated solution or growth on agar was interpreted to indicate the absence of viable microorganisms in the sample and indicates that the sample is sterile.

Functionality was tested by incorporating the albumen into a pancake batter and evaluating the pancakes prepared therefrom. The ingredients used, in percent by weight, were:

| | |
|---|---|
| Flour | 30 |
| Aqueous heat-treated albumen, 5% solids | 40 |
| Shortening | 4 |
| Dry milk solids | 2 |
| Salt | 0.6 |
| Sugar | 3.8 |
| Flavor | 0.08 |
| Water | 19.52 |

The batter was prepared and leavening was added just before cooking. As a control, a batter similar in formulation, but having albumen which was not heat-treated, was prepared. A batter having no albumen was also prepared for purposes of comparison. The control with untreated albumen had normal pancake eating quality, while the pancake made without albumen was very gummy. The pancakes made from sterile albumen were judged to be like the control in eating quality. This was interpreted to mean that the function of the sterile albumen was essentially as good as that of untreated albumen.

*Example III*

The heat treatment procedure of Example II was performed with sodium myristate at the 0.005 molar level in the aqueous albumen dispersion. The heat-treated albumen protected with sodium myristate was found to be sterile and comparable to the control in eating quality.

*Example IV*

The heat treatment procedure of Example II was performed with sodium palmitate at the 0.005 molar level in the aqueous albumen dispersion. The heat-treated albumen protected with sodium palmitate was found to be sterile and comparable to the control in eating quality.

*Example V*

The heat treatment procedure of Example II was performed with potassium myristate at the 0.005 molar level in the aqueous albumen dispersion. The heat-treated albumen protected with potassium myristate was found to be sterile and comparable to the control in eating quality.

*Example VI*

The heat treatment procedure of Example II was performed with potassium oleate at the 0.005 molar level in the aqueous albumen dispersion. The heat-treated albumen protected with potassium oleate was found to be sterile and comparable to the control in eating quality.

*Example VII*

The heat treatment procedure of Example II was performed with sodium myristate at the 0.003 molar level in the aqueous albumen dispersion. The heat-treated albumen protected with sodium myristate was found to be sterile and comparable to the control in eating quality.

Equivalent results were obtained with soaps containing 20 and 22 carbon atoms in the molecule and also with soaps which contain from 12 to 22 carbon atoms in the molecule and which are unsaturated, so that soaps of arachidic, behenic, oleic, myristoleic, punicic, arachidonic, linoleic, linolenic, and erucic acids yield equivalent results when employed in the foregoing example. The higher stability of the saturated soap creates a slight preference toward their use. Naturally, those skilled in the art will realize that mixtures of the various fatty acid soaps such as those obtained from natural fats and oils (cottonseed oil, soybean oil, tallow and the like) can be used with similar results. The substitution of potassium, lithium, or any of the other alkali-metals as the soap cation in the above example produces results equivalent to those obtained with the sodium cation.

An atempt to repeat the procedure of Example VII using 0.001 molar myristate, instead of the 0.003 molar myristate used so successfully in said example, resulted in considerable damage to the functional properties of the albumen, although the damage was not as severe as when no soap was present during the heat treatment.

If a large quantity of soap (that is, a quantity beyond the preferred ranges of this invention) is added to the albumen prior to sterilization, it may be desirable to remove the insoluble soap from the albumen. Such quantities of insoluble soap can be removed by filtering the sterilized albumen, by centrifuging the material, or using other known techniques for separating two phases of different density. If a very low concentration of albumen solids is used, for example, the viscosity of the sterilized material will be low enough to permit separation of the insoluble soaps by settling under normal gravitational field. Such a removal of insoluble soap from the sterile albumen is also desirable if a cation such as lead or other toxic or undesirable cation had been used to precipitate the soluble soap.

A product made possible by the albumen treated by the process of this invention is a ready-to-use batter. Basically, a batter is a combination of flour and a liquid. Usually fat and egg are added, though one or the other may be omitted: fat is seldom used in popovers, while baking powder biscuits contain no eggs. For goods such as cakes and the like, sugar is also a component of the batter. Most products prepared from batters contain a leavening agent.

The ready-to-use batter contemplated by the instant invention permits the user merely to pour the desired quantity onto a griddle (for pancakes), into a baking pan (for cakes), or into a biscuit pan and cook or bake at the appropriate temperature. There is no need for a mixer or beater or for bowls, and no spilled flour, egg shells, or measuring utensils to clean up. If sterile ingredients are used in the preparation of the batter, there is even no need to refrigerate the container of batter. If the microbiological population is merely reduced, it will be necessary to refrigerate the batter if it is to be stored more than a few days.

The batter is prepared by admixing the heat-treated albumen with flour. Other ingredients are added as desired, depending upon the nature of the product to be prepared. For instance, to prepare a white cake batter, shortening, sugar, salt, milk solids and water are added to the basic flour-albumen combination. For pancakes, the same ingredients are used, but in different proportions. Exemplary of formulas used to prepare ready-to-use batters are the aforementioned recipes for white cake and pancake batters. The batters of this invention (unless the product is to be steam-leavened) may be leavened by the user just before cooking. Of course, the need to add such an ingredient negates some of the convenience of a ready-to-use batter. For that reason it is preferred to incorporate the leavening directly into the batter. A double-acting leavening may be used if some leavening action is desirable during preparation of the batter. If no leavening is desirable for the mixing operation, a slow-acting leavening, i.e., one which produces leavening gas only at cooking temperatures, can be used.

The advance over the art having been described, what is claimed is:

1. A process for reducing the microbiological population of albumen, which process comprises adding sufficient soluble alkali-metal soap of at least one fatty acid containing from 12 to 22 carbon atoms in the molecule to produce a soap concentration of from about 0.002 to about 0.010 molar in an aqueous dispersion of albumen containing not more than about six percent albumen solids by weight; subjecting the aqueous mixture of fatty acid soap and albumen to temperatures of at least 212° F. for a period of time sufficient to effect significant reduction of the microbiological population thereof; cooling said mixture; and thereafter removing said soluble soap from solution, whereby the albumen has essentially unimpaired culinary function.

2. A process for sterilizing albumen, which process comprises adding sufficient soluble alkali-metal soap of at least one fatty acid containing from 12 to 22 carbon atoms in the molecule to produce a soap concentration of from about 0.002 to about 0.010 molar in an aqueous dispersion of albumen containing not more than about six percent albumen solids by weight; subjecting the aqueous mixture of fatty acid soap and albumen to temperatures of at least about 250° F. for a period of time sufficient to sterilize said mixture; cooling said mixture; and thereafter removing said soluble soap from solution, whereby the albumen has essentially unimpaired culinary function.

3. A process for reducing the microbiological population of albumen, which process comprises adding sufficient soluble alkali-metal soap of at least one fatty acid containing from about 14 to about 22 carbon atoms in the molecule to produce a soap concentration of from about 0.003 to about 0.007 molar in an aqueous dispersion of albumen containing from about three to about six percent albumen solids by weight; subjecting the aqueous mixture of fatty acid soap and albumen to temperatures of from about 212° F. to about 320° F. for a period of time sufficient to effect significant reduction of the microbiological population thereof; cooling said mixture; and thereafter removing said soluble soap from solution, whereby the albumen has essentially unimpaired culinary function.

4. A process for reducing the microbiological population of albumen, which process comprises adding sufficient soluble alkali-metal soap of at least one fatty acid containing from about 14 to about 22 carbon atoms in the molecule to produce a soap concentration of from about 0.003 to about 0.007 molar in an aqueous dispersion of albumen containing from about three to about six percent albumen solids by weight; subjecting the aqueous mixture of fatty acid soap and albumen to temperatures of from about 212° F. to about 320° F. for a period of time sufficient to effect significant reduction of the microbiological population thereof; cooling said mixture; and thereafter removing said soluble soap from solution by the addition of a salt which will produce an essentially water-insoluble soap, whereby said albumen has essentially unimpaired culinary function.

5. A process for reducing the microbiological population of albumen, which process comprises adding sufficient soluble alkali-metal soap of at least one fatty acid containing from about 14 to about 22 carbon atoms in the molecule to produce a soap concentration of about 0.005 molar in an aqueous dispersion of albumen containing from about three to about six percent albumen solids by weight; subjecting the aqueous mixture of fatty acid soap and albumen to temperatures of from about 212° F. to about 320° F. for a period of time sufficient to effect a significant reduction of the microbiological population thereof; cooling said mixture, and thereafter removing said soap from solution by adding an amount of a water-soluble salt of a metal selected from the group consisting of calcium, barium, magnesium, strontium, and aluminum equimolar to the amount of soap present to produce an essentially water-insoluble soap, whereby said albumen has essentially unimpaired culinary function.

6. A process for sterilizing albumen, which process comprises adding sufficient soluble alkali-metal soap of at least one fatty acid containing from 12 to 22 carbon atoms in the molecule to produce a soap concentration of from about 0.003 to about 0.007 molar in an aqueous dispersion of albumen containing not more than about six percent solids by weight; subjecting the aqueous mixture of fatty acid soap and albumen to temperatures of from about 250° F. to about 320° F. for a period of time sufficient to sterilize said mixture; cooling said mixture; and thereafter removing said soluble soap from solution, whereby the albumen has essentially unimpaired culinary function.

7. A process for sterilizing albumen, which process comprises adding sufficient soluble alkali-metal soap of at least one fatty acid containing from about 14 to about 22 carbon atoms in the molecule to produce a soap concentration of from about 0.003 to about 0.007 molar in an aqueous dispersion of albumen containing from about three to about six percent albumen solids by weight; subjecting the aqueous mixture of fatty acid soap and albumen to temperatures of from about 250° F. to about 320° F. for a period of time sufficient to sterilize said mixture, cooling said mixture, and thereafter removing said soluble soap from solution, whereby the albumen has essentially unimpaired culinary function.

8. A process for sterilizing albumen, which process comprises adding sufficient soluble alkali-metal soap of at least one fatty acid containing from about 14 to about 22 carbon atoms in the molecule to produce a soap concentration of from about 0.003 to about 0.007 molar in an aqueous dispersion of albumen containing from about three to about six percent albumen solids by weight; subjecting the aqueous mixture of fatty acid soap and albumen to temperatures of from about 270° F. to about 300° F. for a period of time sufficient to sterilize said mixture, cooling said mixture, and thereafter removing said soluble soap from solution, whereby the albumen has essentially unimpaired culinary function.

9. A process for sterilizing albumen, which process comprises adding sufficient soluble alkali-metal soap of at least one fatty acid containing from about 14 to about 22 carbon atoms in the molecule to produce a soap concentration of from about 0.003 to about 0.007 molar in an aqueous dispersion of albumen containing from about three to about six percent albumen solids by weight; subjecting the aqueous mixture of fatty acid soap and albumen to temperatures of from about 250° to about 300° F. for from about 20 minutes to about 15 seconds to sterilize said mixture; cooling said mixture, and thereafter removing said soluble soap from solution, whereby the albumen has essentially unimpaired culinary function.

References Cited in the file of this patent
UNITED STATES PATENTS

| | | |
|---|---|---|
| 2,183,515 | Mink | Dec. 12, 1939 |
| 2,183,516 | Mink | Dec. 12, 1939 |
| 2,243,867 | Katzman | June 3, 1941 |
| 2,776,214 | Lloyd et al. | Jan. 1, 1957 |
| 2,982,663 | Berquist | May 2, 1961 |
| 3,076,715 | Greenfield | Feb. 5, 1963 |